United States Patent [19]
Courtney

[11] Patent Number: 5,714,990
[45] Date of Patent: Feb. 3, 1998

[54] OPTIMIZING PRINTING SPEED AND MANAGING PRINTED SHEET EJECTION BASED ON IMAGE DENSITY AND METHOD OF DETERMINING DENSITY

[75] Inventor: Thomas P. Courtney, Fairport, N.Y.

[73] Assignee: Xerox Corporation, Stamford, Conn.

[21] Appl. No.: 367,610

[22] Filed: Jan. 3, 1995

[51] Int. Cl.$^6$ ................... B41S 2/01; B41S 2/17
[52] U.S. Cl. ................... 347/14; 347/16; 347/102; 395/115
[58] Field of Search ............... 347/14, 16, 102, 347/15, 19; 400/54, 124.13; 382/288, 169; 395/115, 102, 114

[56] References Cited

U.S. PATENT DOCUMENTS

| | | | |
|---|---|---|---|
| 4,469,026 | 9/1984 | Irwin | 101/484 |
| 4,566,014 | 1/1986 | Paranjpe et al. | 346/25 |
| 4,686,538 | 8/1987 | Kouzato | 347/15 |
| 4,833,626 | 5/1989 | Malcolm | 395/108 |
| 5,214,442 | 5/1993 | Roller | 347/102 |
| 5,326,183 | 7/1994 | Kasai et al. | 400/124.04 |
| 5,349,905 | 9/1994 | Taylor et al. | 101/488 |
| 5,382,101 | 1/1995 | Iguchi | 400/124.03 |
| 5,530,466 | 6/1996 | Fukioka et al. | 347/104 |

FOREIGN PATENT DOCUMENTS

| | | |
|---|---|---|
| 0 423 820 A2 | 10/1990 | European Pat. Off. . |
| 0 622 203 A2 | 4/1994 | European Pat. Off. . |
| 0 622 204 A2 | 4/1994 | European Pat. Off. . |
| 02078586 | 3/1990 | Japan . |
| 03173647 | 7/1991 | Japan . |

*Primary Examiner*—Benjamin R. Fuller
*Assistant Examiner*—Craig A. Hallacher
*Attorney, Agent, or Firm*—Oliff & Berridge, P.L.C.

[57] ABSTRACT

The printing operation of an ink jet printer is controlled based on the density of the image to be printed. Using the density, a required drying time for each swath of printed matter is determined based on the image density. Also using the density, a maximum print frequency of firing the ink jets is determined. The density is determined by filtering stored print data by dividing the print data into blocks and determining a maximum number of ON pixels in a block. Such filtering enables clusters of ON pixels to be detected thus providing a more accurate determination of the density.

56 Claims, 3 Drawing Sheets

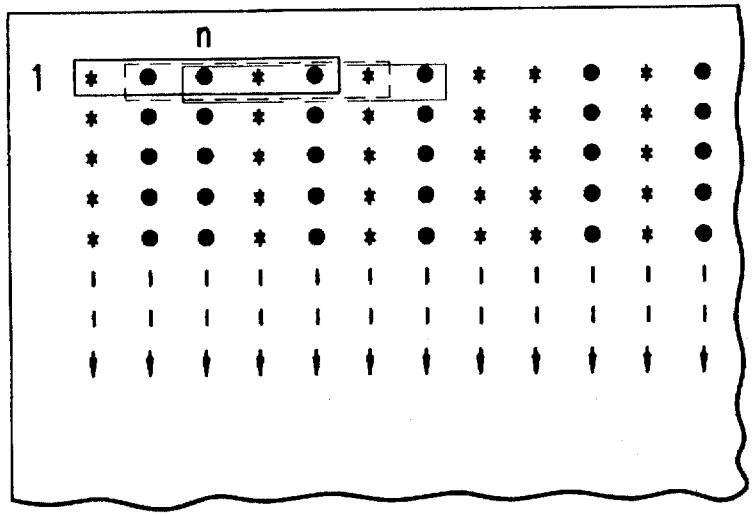 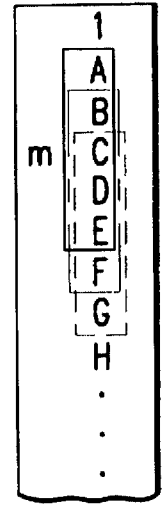
FIG.3A  FIG.3B
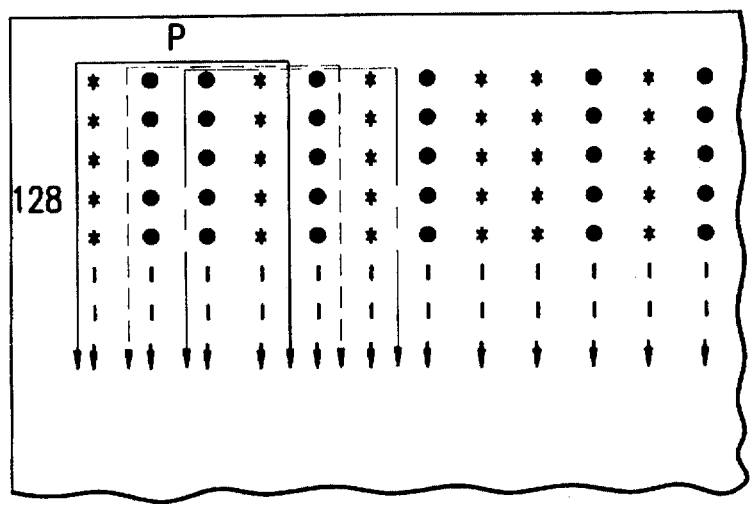
FIG.4

५,७१४,९९०

OPTIMIZING PRINTING SPEED AND MANAGING PRINTED SHEET EJECTION BASED ON IMAGE DENSITY AND METHOD OF DETERMINING DENSITY

BACKGROUND OF THE INVENTION

1. Object of the Invention

This invention relates to controlling an ink jet printing apparatus based on printed image density. More particularly, this invention relates to determining density of an image to be printed and optimizing printing speed and managing printed sheet ejection based on the image density.

2. Description of Related Art

Ink jet printers function by depositing droplets or dots of wet ink on a substrate in a predetermined pattern. The patterns printed by such printers have become very sophisticated and complicated. For example, it is common for a printer to be instructed to print bar charts or other figures that have large solid fill regions. To improve efficiency, ink jet printers have also been required to print at very high frequencies to increase the printing production. However, when large solid fill regions are printed, the dry time required to dry such a region can be double compared to dry time required for text.

When printing at high speeds, areas of high density in the image require greater drying time. Therefore, when printed sheets are ejected according to a normal printing operation, the high density areas may still be wet and subsequently ejected sheets will smear and blot the wet images on the underlying sheets, thus degrading the image. Thus, it is desirable to prevent output printed sheets from stacking on one another until they are sufficiently dry to prevent smearing.

Several prior art printers have attempted to determine drying time and vary the intersheet spacing to prevent smearing and blotting when printing at high speed. For example, U.S. Pat. No. 4,566,014 to Paranjpe et al. controls intersheet gaps or spacings between successive sheets of copy paper based on the print densities of the sheets. U.S. Pat. No. 4,469,026 to Irwin also controls drying time based on print data density, ink characteristics and ambient humidity. Using these parameters, detaching of the print media from the rotary transport is controlled.

Also, conventional ink jet devices are incapable of printing solid fill regions at the high print frequencies now required because the refill time required for each ink jet is higher than the demanded print frequency. Refill time is a function of the amount of fluid demanded by the jets. When all the jets are instructed to fire, the refill time substantially increases, which prohibits the ink jets from firing at high frequencies. Thus, when a solid fill region is printed, conventional ink jet printers print with several defects. First, the optical density rapidly declines. Second, the jets may intermittently fire resulting in a grainy or streaky appearance.

Several prior art apparatus have attempted to vary the speed of the printing based on the density of the printed image. For example, U.S. Pat. No. 5,326,183 to Kasai et al. determines the printing dot density by averaging the density during a predetermined period of time and selects a printing speed responsive to the average value of the dot density. U.S. Pat. No. 4,833,626 to Malcolm also selects a print velocity based on the characteristics of a line to be printed. These patents select a print speed based on the image density to prevent misfiring of the ink jets and provide time for the ink jets to properly refill.

However, a sheet of printed data often has areas of differing print densities. None of the above techniques can accurately determine the presence of localized high density areas that significantly affect drying time and print frequency. Therefore, there is a need for accurately determining density across the entire swath of printed matter while optimizing printing speed and managing page ejection to prevent image smear.

SUMMARY OF THE INVENTION

Therefore, an object of this invention is to accurately determine density of a printed image, particularly with respect to localized high density areas.

Another object of the invention is to optimize printing speed based on the density of an image.

An additional object of the invention is to efficiently manage printed sheet ejection to prevent image smear based on image density.

The above and other objectives are achieved by the embodiments of this invention that include a method of printing a swath of print data with an ink jet printer comprising storing print data as an array of ON and OFF pixels, determining image density for a swath of the stored print data, and controlling the printing operation of the swath based on the image density. The image density according to this invention is determined by defining a window that encompasses the blocks of pixels in the array, positioning the window around successive blocks of pixels in the entire array, counting a number of ON pixels in each successive block, recording the number of ON pixels for each block, determining a maximum number of ON pixels in a block from the recorded numbers of ON pixels, and determining the image density for the swath of print data based on the determined maximum number of ON pixels. Based on the determined image density, a drying time required for each swath is determined and ejection of the printed sheets is controlled. Also, based on the determined image density, a maximum print frequency of firing of the ink jets is determined.

The above and other objectives are accomplished by embodiments of this invention by providing an ink jet printing device that controls a printing operation based on image density comprising a memory that stores print data as an array of ON and OFF pixels, an image density determiner, and a controller that controls the printing operation based on the image density. The image density determiner determines image density for a swath of stored print data and includes a filter that filters through successive blocks of print data in the array, a counter that counts ON pixels in each filtered block, and a computing mechanism that determines a maximum number of ON pixels for a block of print data in the array.

By determining the density according to the embodiments of this invention, localized high density areas are accurately determined. Therefore, the printing speed and the sheet ejection can be properly managed.

Other objects, advantages and salient features of the invention will become apparent from the following detailed description, which taken in conjunction with the annexed drawings discloses preferred embodiments of the invention.

BRIEF DESCRIPTION OF THE DRAWINGS

Referring now to the drawings that form a part of this original disclosure:

FIGS. 3A and 3B are graphical illustrations of the filtering technique to determine density according to a first embodiment of this invention; and FIG. 4 is a graphical illustration of the filtering technique to determine density according to a second embodiment of this invention.

DETAILED DESCRIPTION OF PREFERRED EMBODIMENTS

This invention is described with respect to an ink jet printing mechanism having a printhead that ejects droplets of wet ink. However, it is applicable to any printing mechanism that utilizes wet ink deposition. Further, the methods of determining density described herein are applicable to analyzing an array of any type of data.

Figure 1:
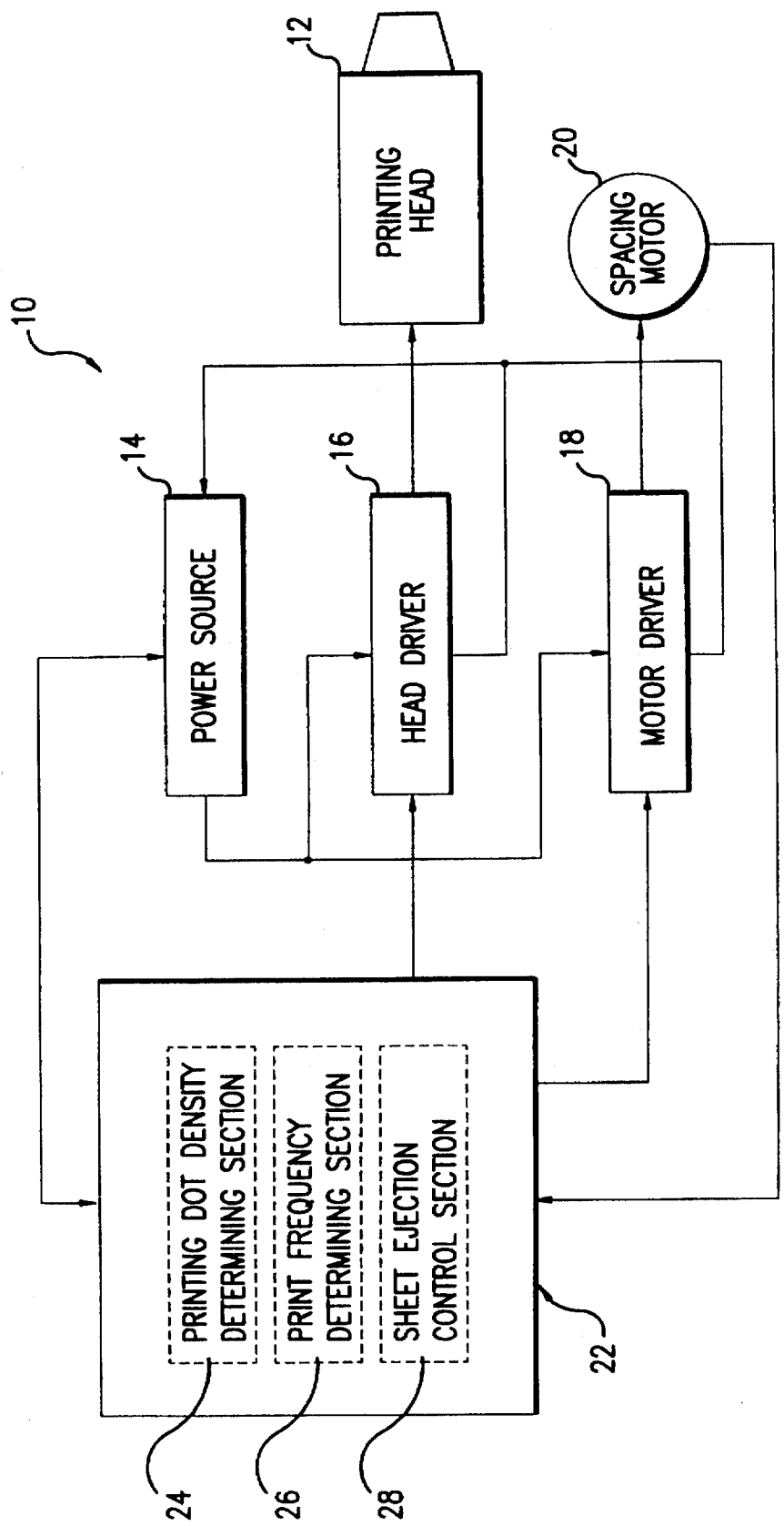
FIG. 1 is a schematic drawing of the primary elements of an ink jet printing mechanism employing this invention.

FIG. 1 shows a printing apparatus 10 having a printing head 12, a power source 14, a head driver 16, a motor driver 18, a spacing motor 20 and a CPU 22. Printing apparatus 10 is powered by powered source 14 to drive printing head 12 via head driver 16 to eject ink droplets onto a printing medium. CPU 22, which is a data processing apparatus such as a microprocessor, controls the printing process through head driver 16 and controls the printed sheet ejection through motor driver 18 and spacing motor 20. CPU 22 includes a printing dot density determining section 24, a print frequency determining section 26, and a sheet ejection control section 28. CPU 22 also includes standard ROM and RAM memories for storing print control programs and input print data.

Printing dot density determining section 24 determines the density of the image using stored print data as discussed in detail below.

Print frequency determining section 26 determines the maximum frequency at which an ink jet device may print a solid fill region. Conventionally, most text less than 24 Pt and most graphics and halftones may be printed at frequencies 30% or more greater than frequencies at which solid filled regions may print. Solid fill regions suffer from reduced optical density and intermittent jetting at these higher frequencies. Using the density as determined by the method described below, a maximum print frequency for a swatch containing for example text and solid fill regions may be determined. According to this invention, the frequency is determined on a swath by swath basis to optimize overall throughput and maintain excellent print quality. The frequency is controlled using conventional methods of varying the electrical pulse that causes the individual ink jets to eject a droplet of ink onto the substrate.

CPU 22 also includes a sheet ejection control section 28 that determines a dry time required per swath and controls sheet ejection based on that dry time. After a sheet is printed, sheet ejection control section 28 prevents a subsequent printed sheet to fall against any swaths whose dry time requirements have not been fulfilled. Therefore, smear and blotting are prevented between adjacent sheets in the output stack. Sheet ejection can be controlled by varying the maximum permissible scanning speed of the image to be printed or managing the page ejection by implementing page eject delays. In this embodiment, spacing motor 20 controls the sheet feed to delay ejection of a sheet until the required drying time has elapsed. Spacing motor 20 include a counter or timer such that a swath is printed and drying time is measured by decrementing the counter until drying time is satisfied. Then, the next printed sheet is ejected. The timer can be set for each swath based on the contact zone of stacked sheets in the output tray. Preferably, the timer is set for each swath from the printing of a first page to the time at which a second page touches an area of the first page upon ejection. Any conventional sheet ejection control can be used with this invention.

Figure 2:
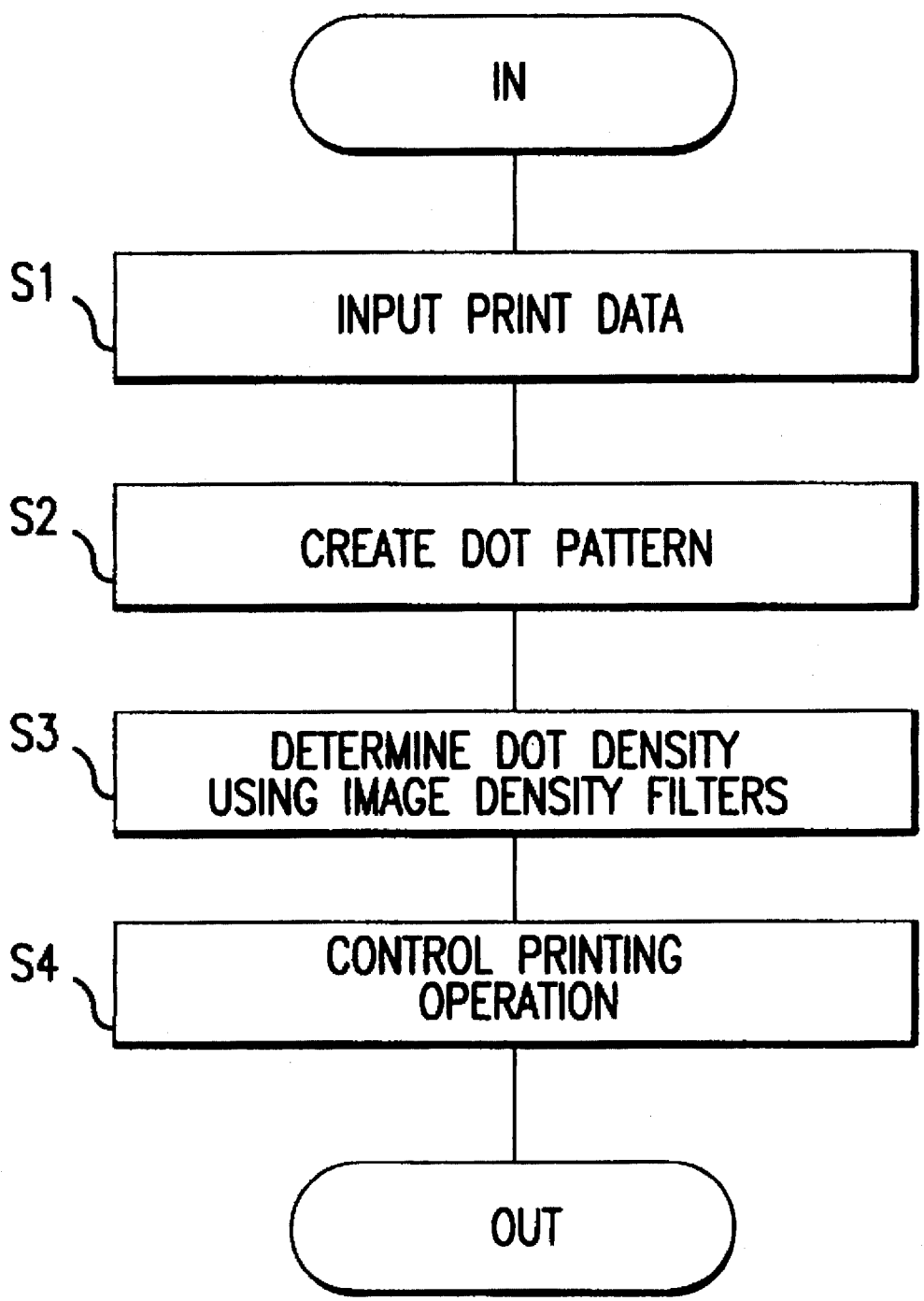
FIG. 2 is a flow chart illustrating the steps of controlling printing according to this invention.

FIG. 2 is a flow chart that illustrates the steps of controlling the printing operation. First, print data is input in step S1. Next, a dot pattern of the input print data is created in step S2. Preferably, the print data is arranged in an array of ON and OFF pixels. In step S3, the dot density is determined using an image density filter according to this invention. Once the dot density is determined, the printing operation is controlled in step S4 by controlling the print frequency and/or the printed sheet ejection as described above.

The image density is determined by printing dot density determining section 24, which analyzes the print data stored in CPU 22. Basically, image density is dependent on the maximum number of pixels that fill a given two dimensional area within a swath. A swath represents one pass of printhead. Each ink jet within a printhead across a swath produces a raster, which is a line of printed data within a swath.

In the first embodiment for determining the image density, a filter analyzes the print data on a raster by raster basis as shown in FIG. 3A. Using the raster by raster filtering method to determine density, first, a window is formed at the upper left edge of an array of print data, which represents the top raster in a swath, as shown in FIG. 3A. According to this embodiment, the window has a size of n×1. n may be any integer, but, for illustrative purposes in this embodiment, n is preferably 48. For purposes of simplicity however, n is shown in FIG. 3A as 5. First, the n×1 window begins at the left edge of the top raster. The number of ON pixels is counted. The window then moves to the right, as shown by the dashed box in FIG. 3A. The window can be moved one pixel as shown or at greater pixel intervals, such as eight pixel intervals. The number of ON pixels in this window is then counted. The process continues across the array as shown in FIG. 3A until the window reaches the end of the raster. The maximum number of ON pixels found in a window is recorded. The same procedure is used for each of the remaining rasters. For example, in a printhead having 128 vertically aligned ink jets that produces 128 rasters per swath, 128 values representing the maximum fill of any n×1 window within each raster is recorded. These values are stored as a data array as shown in FIG. 3B. For example, in an ink jet having an 128 vertically aligned jets, the data array of maximum numbers would be 1×128.

Next, a second window is formed at the top of the array of maximum numbers. This window has a size of 1×m. Preferably, in this embodiment, m is 48. However, for illustrative purposes, in FIG. 3B, m is shown as 5. The average for all the data within the second window is computed. Then, the 1×m window is moved down the array calculating averages within each window as shown in FIG. 3B. The maximum average value is determined from the set of calculated average values. The maximum average value is a representation of the maximum image density for that swath.

According to a second embodiment of this invention to determine density, the print data is analyzed in a column format, as shown in FIG. 4. In this embodiment, a window is also formed at the top left edge of an array of print data representing a swath. As shown in FIG. 4, this window has the size of p×128, with 128 representing the number of vertically aligned ink jets. The preferred value of p in this embodiment is 48. However, for purposes of illustration, p is shown in FIG. 4 as 4. In operation, if p is too small, the dry time required for areas larger than p×128 cannot be determined, which would require the assumption of the worst case dry time when in fact the dry time requirement is substantially less. Also, if p is too small, it is difficult to discern between double rows of small text versus one row of large text. It is unnecessary to make p substantially larger than 48 because the dry time requirement does not grow significantly for filled regions greater than 48×128.

Using the second embodiment to determine density, the total number of ON pixels within the window p×128 is counted. The window is then incremented to the right and the total number of ON pixels is counted. Preferably, the window is incremented at eight pixel intervals to decrease the time required to determine density and to correspond to the recorded bits of information. However, to increase resolution, the window can be incremented one pixel at a time. The process continues across the swath until the p×128 window reaches the right edge of the array. The maximum number of ON pixels found in any of the windows is determined. This value is a representation of the maximum density for that swath.

Although the above examples of determining density were described with respect to a conventional data array read from left to right, the method of determining the density can be employed in a data array that is read right to left or from top to bottom and bottom to top.

The maximum image density determined for each swath is then used to control the print frequency and sheet ejection as described above.

While advantageous embodiments have been chosen to illustrate the invention, it will be understood by those skilled in the art that various changes and modifications can be made therein without departing from the scope of the invention as defined in the appended claims.

What is claimed is:

1. A method of printing a swath of print data with an ink jet printer comprising the steps of:
   storing print data as an array of ON and OFF pixels;
   prior to printing, determining image density for a swath of the stored print data including
      defining a window that encompasses a block of pixels in the array,
      positioning the window around successive blocks of pixels in the entire array by defining a first window around a first block of pixels, and then successively redefining a window around a second block of pixels that overlaps pixels from the first block,
      counting a number of ON pixels in each successive block,
      recording the number of ON pixels for each block,
      determining a maximum number of ON pixels in one block selected from the recorded numbers of ON pixels of each block, and
      determining the image density for the swath of stored print data based on the determined maximum number of ON pixels; and
   controlling the printing operation of the swath based on the determined image density of the stored print data.

2. The method of claim 1 wherein the step of controlling the printing operation includes determining a drying time required for each swath based on the image density and controlling ejection of a printed sheet into a discharge tray based on the drying time required for the swath.

3. The method of claim 1 wherein the step of controlling the printing operation includes determining a maximum print frequency of firing of ink jets based on the image density and controlling the frequency of firing of the ink jets based on the maximum print frequency allowed for the swath.

4. The method of claim 1 wherein the step of defining the window includes setting the window to be as high as an array of jets on a print head.

5. The method of claim 1 wherein the step of defining the window includes setting the window size to be p×128 pixels, wherein p is an integer.

6. The method of claim 5 wherein the step of setting the window size includes setting p equal to 48.

7. The method of claim 1 wherein the array of print data represents a swath including a plurality of rasters and the step of positioning the window around successive blocks includes positioning the window around a block in the array at one edge of each raster and then moving the window successively across each raster to the other edge.

8. The method of claim 7 wherein moving the window successively across each raster includes moving the window at least one pixel from the previous position.

9. The method of claim 7 wherein the step of determining a maximum number of ON pixels for a block from the recorded numbers of ON pixels includes determining the maximum number of ON pixels for each block in each raster and recording the maximum number for each raster in an array.

10. The method of claim 9 wherein the step of determining the image density for the swath of image data based on the determined maximum number of ON pixels includes determining a maximum average value of ON pixels from the recorded maximum number of all of the rasters.

11. The method of claim 10 wherein the step of determining a maximum average value of ON pixels includes
   defining a second window for a subset of the recorded maximum numbers for the rasters,
   positioning the second window around successive subsets in the array of recorded maximum numbers,
   computing an average value for the recorded maximum numbers in each successive subset, and
   determining a maximum average value from the average values computed for each subset as representative of the image density.

12. The method of claim 11 wherein the step of positioning the second window around successive subsets includes successively repositioning the window in increments of one recorded maximum number.

13. The method of claim 11 wherein the step of defining the second window includes setting a window size of 1×m, wherein m is an integer.

14. The method of claim 13 wherein the step of setting the second window size includes setting m equal to 48.

15. The method of claim 1 wherein the array of print data represents a swath and the step of positioning the window around successive blocks includes first positioning the window around a block at one edge of the swath and then moving the window successively across the swath to the other edge.

16. The method of claim 15 wherein moving the window successively across the swath includes moving the window at eight pixel intervals.

17. The method of claim 15 wherein moving the window successively across the swath includes moving the window at least one pixel from the previous position.

18. The method of claim 1 wherein the step of defining the window includes setting the window size to be n×1 pixels, wherein n is an integer.

19. The method of claim 18 wherein the step of setting the window size includes setting n equal to 48.

20. A method of determining image density for image data stored as an array of ON and OFF pixels, comprising the steps of:

defining a window that encompasses a block of pixels in the array;

positioning the window around successive blocks of pixels in the entire array such that subsequently formed windows overlap previously formed windows;

counting a number of ON pixels in each successive block;

recording the number of ON pixels for each block;

determining a maximum number of ON pixels in one block selected from the recorded numbers of ON pixels from each block; and determining the image density for the stored image data based on the determined maximum number of ON pixels.

21. The method of claim 20 wherein the image data corresponds to a print swath and the step of positioning the window around successive blocks includes first positioning the window around a block at one edge of the swath and then moving the window successively across the swath to the other edge.

22. The method of claim 21 wherein moving the window successively across the swath includes moving the window at eight pixel intervals.

23. The method of claim 21 wherein moving the window successively across the swath includes moving the window at least one pixel from the previous position.

24. The method of claim 20 wherein the step of positioning the window around successive blocks includes first positioning the window at a left edge of the array of image data and moving the window at least one pixel to the right for each successive block until the window reaches the right edge of the array.

25. The method of claim 20 wherein the step of positioning the window around successive blocks includes first positioning the window at a right edge of the array of image data and moving the window at least one pixel to the left for each successive block until the window reaches the left edge of the array.

26. The method of claim 20 wherein the step of defining the window includes setting the window to have a size of p×128 pixels, wherein p is an integer.

27. The method of claim 26 wherein the step of setting the window size includes setting p equal to 48.

28. The method of claim 20 wherein the step of defining the window includes setting the window to be as high as an array of jets on a print head.

29. The method of claim 20 wherein the array of image data corresponds to a print swath including a plurality of rasters and the step of positioning the window around successive blocks includes positioning the window around a block at one edge of each raster and then moving the window successively across each raster to the other edge.

30. The method of claim 29 wherein moving the window successively across each raster includes moving the window at least one pixel from the previous position.

31. The method of claim 29 wherein the step of determining a maximum number of ON pixels for a block from the recorded numbers of ON pixels includes determining the maximum number of ON pixels for each block in each raster and recording the maximum number for each raster in an array.

32. The method of claim 29 wherein the step of determining the image density for the image data based on the determined maximum number of ON pixels includes determining a maximum average value of ON pixels from the recorded maximum number of all of the rasters.

33. The method of claim 32 wherein the step of determining a maximum average value of ON pixels includes defining a second window for a subset of the recorded maximum numbers for the rasters, positioning the second window around successive subsets in the array of recorded maximum numbers, computing an average value for the recorded maximum numbers in each successive subset, and determining a maximum average value from the average values computed for each subset as representative of the image density.

34. The method of claim 33 wherein the step of positioning the second window around successive subsets includes successively repositioning the window in increments of one recorded maximum number.

35. The method of claim 33 wherein the step of defining the second window includes setting a window size of 1×m, wherein m is an integer.

36. The method of claim 35 wherein the step of setting the second window size includes setting m equal to 48.

37. The method of claim 20 wherein the step of defining the window includes setting the window to have a size of n×1 pixels, wherein n is an integer.

38. The method of claim 37 wherein the step of setting the window size includes setting n equal to 48.

39. An ink jet printing device that controls a printing operation based on image density comprising:

a memory that stores print data as an array of ON and OFF pixels;

an image density determiner that determines image density for a swath of the stored print data including a filter that filters through successive blocks of print data in the array, a counter that counts ON pixels in each filtered block, and a computing mechanism that determines a maximum number of ON pixels for one block of the stored print data in the array, wherein the blocks are overlapping such that some pixels are counted in more than one block; and a controller that controls the printing operation based on the image density of the stored print data.

40. The ink jet printing device of claim 39 wherein the controller comprises an ink jet controller that controls a frequency of firing of ink jets in the device.

41. The ink jet printing device of claim 39 wherein the controller comprises a timer that times ejection of a printed sheet based on drying time determined from the image density.

42. The ink jet printing device of claim 39 wherein the filter comprises:

a windowing mechanism that defines a window that encompasses a block of pixels in the array; and a positioner that positions the windowing mechanism around successive blocks of pixels in the entire array.

43. The ink jet printing device of claim 42 wherein the positioner positions the window around successive blocks starting at one edge of the array and then moving the window successively across the array to the other edge.

44. The ink jet printing device of claim 42 wherein the windowing mechanism defines the window by setting the window to be as high as an array of jets on a printhead.

45. The ink jet printing device of claim 42 wherein the windowing mechanism sets the window size to be p×128 pixels, wherein p is an integer.

46. The ink jet printing device of claim 45 wherein the windowing mechanism sets the window size for p equal to 48.

47. The ink jet printing device of claim 42 wherein the array of image data corresponds to a print swath including a plurality of rasters and the positioner positions the window around successive blocks starting at one edge of each raster and then moving the window successively across each raster to the other edge.

48. The ink jet printing device claim 47 wherein the positioner moves the window successively across each raster at least one pixel at a time.

49. The ink jet printing device of claim 47 wherein the computing mechanism determines a maximum number of ON pixels for each block from the recorded numbers of ON pixels in each raster and records the maximum number for each raster in an array.

50. The ink jet printing device of claim 49 wherein the computing mechanism determines a maximum average value of ON pixels from the recorded maximum number of all of the rasters.

51. The ink jet printing device of claim 50 wherein the computing mechanism further comprises:

a second windowing mechanism that groups subsets of the recorded maximum numbers for the rasters;

a second positioner that positions the second windowing mechanism around successive subsets in the array of recorded maximum numbers;

an average computing mechanism that computes an average value for the recorded maximum numbers in each successive subset and determines a maximum average value from the average values computed for each subset as representative of the image density.

52. The ink jet printing device of claim 51 wherein the second positioner positions the second window around successive subsets by successively repositioning the window in increments of one recorded maximum number.

53. The ink jet printing device of claim 51 wherein the second windowing mechanism defines the second window by setting a window size of 1×m, wherein m is an integer.

54. The ink jet printing device of claim 53 wherein the second windowing mechanism sets the second window size for m equal to 48.

55. The ink jet printing device of claim 42 wherein the windowing mechanism sets the window size to be n×1 pixels, wherein n is an integer.

56. The ink jet printing device of claim 55 wherein the windowing mechanism sets the window size for n equal to 48.

\* \* \* \* \*